(12) United States Patent
Sabella et al.

(10) Patent No.: US 6,715,680 B2
(45) Date of Patent: Apr. 6, 2004

(54) DATA READER MODULE COMBINABLE WITH A PAGER

(75) Inventors: Paul Sabella, 6452 River Run, Columbia, MD (US) 21044; Charles F. Finch, East Quogue, NY (US); Carl J. Rinne, Jr., Nanuet, NY (US); Kurt R. Heino, East Quogue, NY (US); Brian J. McCahery, Robbinsville, NJ (US)

(73) Assignees: Comstar Interactive Corp., New York, NY (US); Paul Sabella, Columbia, MD (US)

( * ) Notice: Subject to any disclaimer, the term of this patent is extended or adjusted under 35 U.S.C. 154(b) by 0 days.

(21) Appl. No.: 10/377,644

(22) Filed: Mar. 4, 2003

(65) Prior Publication Data

US 2003/0127515 A1 Jul. 10, 2003

Related U.S. Application Data

(63) Continuation-in-part of application No. 10/147,461, filed on May 17, 2002, now Pat. No. 6,543,689.
(60) Provisional application No. 60/291,317, filed on May 17, 2001.

(51) Int. Cl.[7] .............................. G06K 7/08; G06K 7/10
(52) U.S. Cl. .................. 235/449; 235/383; 235/472.01; 235/472.02
(58) Field of Search ................................. 235/381, 383, 235/441, 449, 472.01, 472.02; 379/428–440

(56) References Cited

U.S. PATENT DOCUMENTS

| | | | |
|---|---|---|---|
| 4,916,441 A | 4/1990 | Gombrich | 340/712 |
| 5,221,838 A | 6/1993 | Gutman et al. | 235/377 |
| 5,233,547 A | 8/1993 | Kapp et al. | 364/705.02 |
| 5,408,078 A | 4/1995 | Campo et al. | 235/380 |
| 5,528,758 A | 6/1996 | Yeh | 395/200.08 |
| 5,541,398 A | 7/1996 | Hanson | 235/472 |
| 5,541,985 A | 7/1996 | Ishii et al. | 379/111 |
| 5,748,737 A | 5/1998 | Daggar | 380/24 |
| 5,815,570 A | 9/1998 | Hannon et al. | 379/428 |
| 5,854,595 A | 12/1998 | Williams | 340/325.44 |
| 5,869,825 A | 2/1999 | Ziarno | 235/380 |
| 5,945,652 A | 8/1999 | Ohki et al. | 235/380 |
| 5,963,877 A | 10/1999 | Kobayashi | 455/567 |
| 6,010,067 A | 1/2000 | Elbaum | 235/380 |
| 6,016,956 A | 1/2000 | Takami et al. | 235/380 |
| 6,021,187 A | 2/2000 | Tombetti | 379/110.01 |
| 6,073,034 A | 6/2000 | Jacobsen et al. | 455/566 |
| 6,078,908 A | 6/2000 | Schmitz | 705/50 |
| 6,105,006 A | 8/2000 | Davis et al. | 705/35 |
| 6,131,811 A | 10/2000 | Gangi | 235/380 |
| 6,142,369 A | 11/2000 | Jonstromer | 235/380 |
| 6,164,531 A | 12/2000 | Harris et al. | 235/380 |
| 6,170,745 B1 | 1/2001 | Schilling | 235/382.5 |
| 6,175,922 B1 | 1/2001 | Wang | 713/182 |
| 6,418,325 B1 | 7/2002 | Reber et al. | 455/556 |
| 6,535,199 B1 * | 3/2003 | Canova et al. | 345/168 |
| 6,543,689 B2 * | 4/2003 | Sabella | 235/449 |

* cited by examiner

Primary Examiner—Thien M. Le
Assistant Examiner—April Nowlin
(74) Attorney, Agent, or Firm—Hoffman, Wasson & Gitler PC

(57) ABSTRACT

A caddy receivably retains a two-way messaging pager. The caddy has a connector for power and data transfer between the pager and caddy. The caddy can also be equipped with a magnetic strip card reader. This enables remote transactions using a magnetic strip card such as a credit card or debit card. The caddy has serial bus ports for attaching the caddy to peripheral devices such as printers and taxi fare meters.

15 Claims, 9 Drawing Sheets

DATA READER MODULE COMBINABLE WITH A PAGER

This application is a continuation-in-part of U.S. Ser. No. 10/147,461, filed May 17, 2002 now U.S. Pat. No. 6,543,689 and claims benefit of provisional application Ser. No. 60/291,317, filed on May 17, 2001.

BACKGROUND OF THE INVENTION

Wireless communication allows people to create many tasks without having to be near a computer or other device which cannot be easily transported. The ability to send computer generated voice messages, text messages, telefax messages, and other information through a wireless device greatly enhances the flexibility a person has in keeping in communication. The prior art does not disclose a device that can be connected with an existing pager to enable the reading of a card having a magnetic strip.

It is an object of the invention to provide device attaching to a pager and having a data reader.

It is another object of the invention to provide, wireless means for processing transactions.

It is another object of the invention to provide a device that may have both a magnetic reader and an optical code reader.

It is the object of the invention to provide a device that is inexpensive and easy to use.

These and other objects of the invention will become apparent when after reading the disclosure of the invention.

SUMMARY OF THE INVENTION

A caddy receivably retains a two-way messaging pager. The caddy has a connector for power and data transfer between the pager and caddy. The caddy is equipped with a data reader. The data reader may be a magnetic strip reader or an optical code reader (OCR). This enables remote transactions using the a credit card or debit card. The caddy has serial bus ports for attaching the caddy to peripheral devices such as printers and taxi fare meters. An optical code reader may be attached to the caddy's serial bus port via a cable.

DETAILED DESCRIPTION OF THE INVENTION

Figure 1:
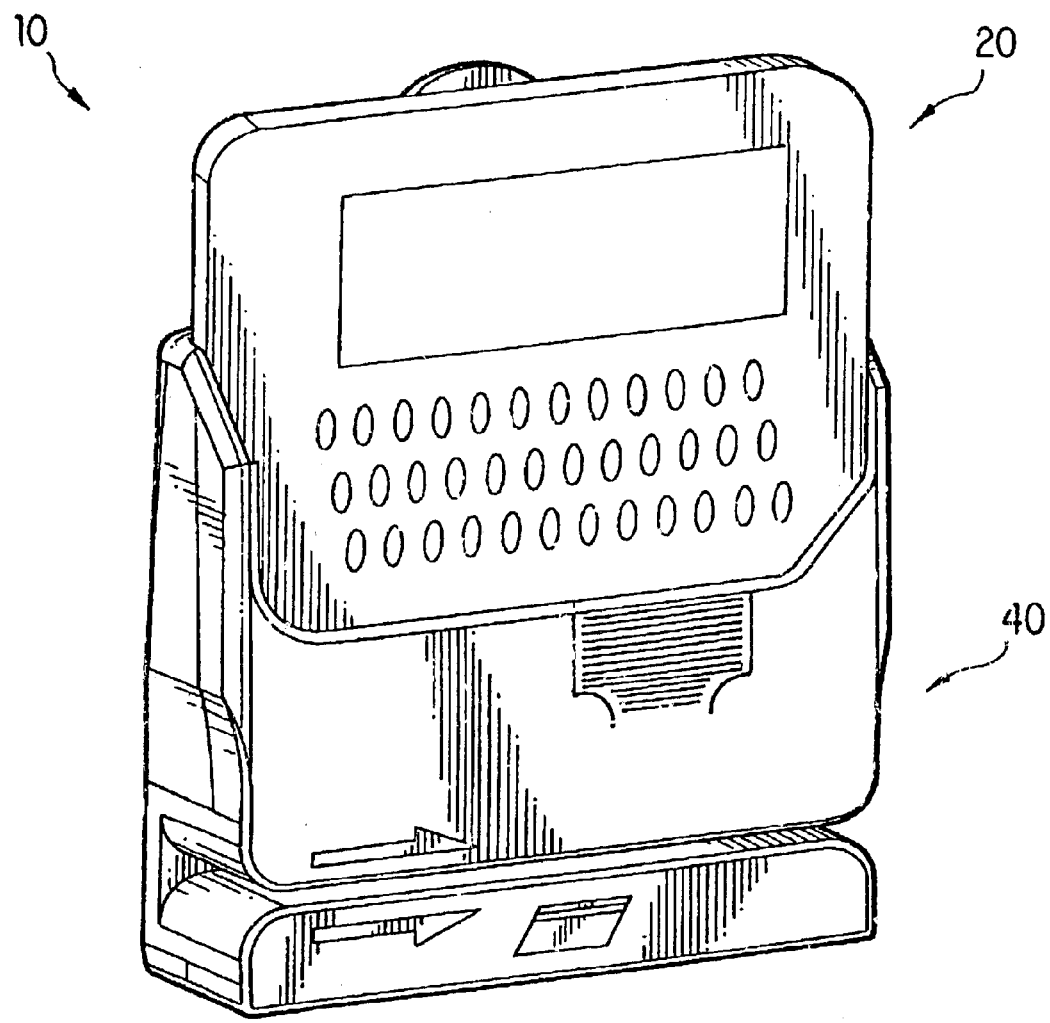
FIG. 1 is a front perspective view of the combined pager and magnetic card reader.

The combined pager and magnetic card reader 10 is seen in FIG. 1. The device has a two way messenger pager 20 combined with a magnetic card reader 40 into one unit. The card reader slot is in the front of the device and allows the user to swipe the card either horizontally or vertically.

Figure 2:
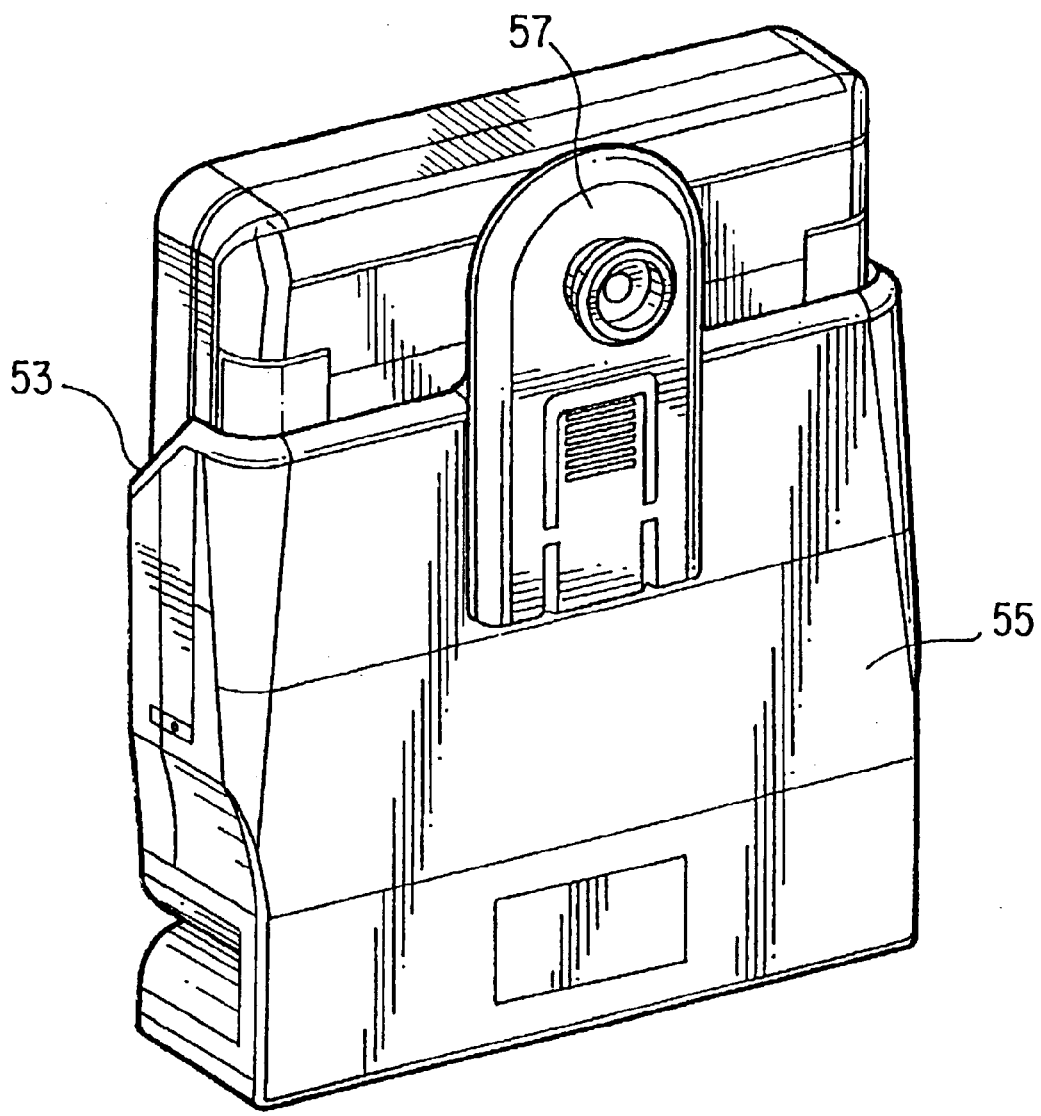
FIG. 2 is a rear perspective view of the combined pager and magnetic card reader.

FIG. 2 is a rear perspective view of the device. The back panel 55 supports a clip 57. The clip 57 can be of any conventional design for attaching the device to a user's belt, for instance. The side wall 52 of the magnetic card reader connects the back wall 55 to the front wall upper portion 43. The top edge 53 of the side wall 52 angles downwardly due to the greater height of the rear wall 55 relative to the front wall 43.

Figure 3:
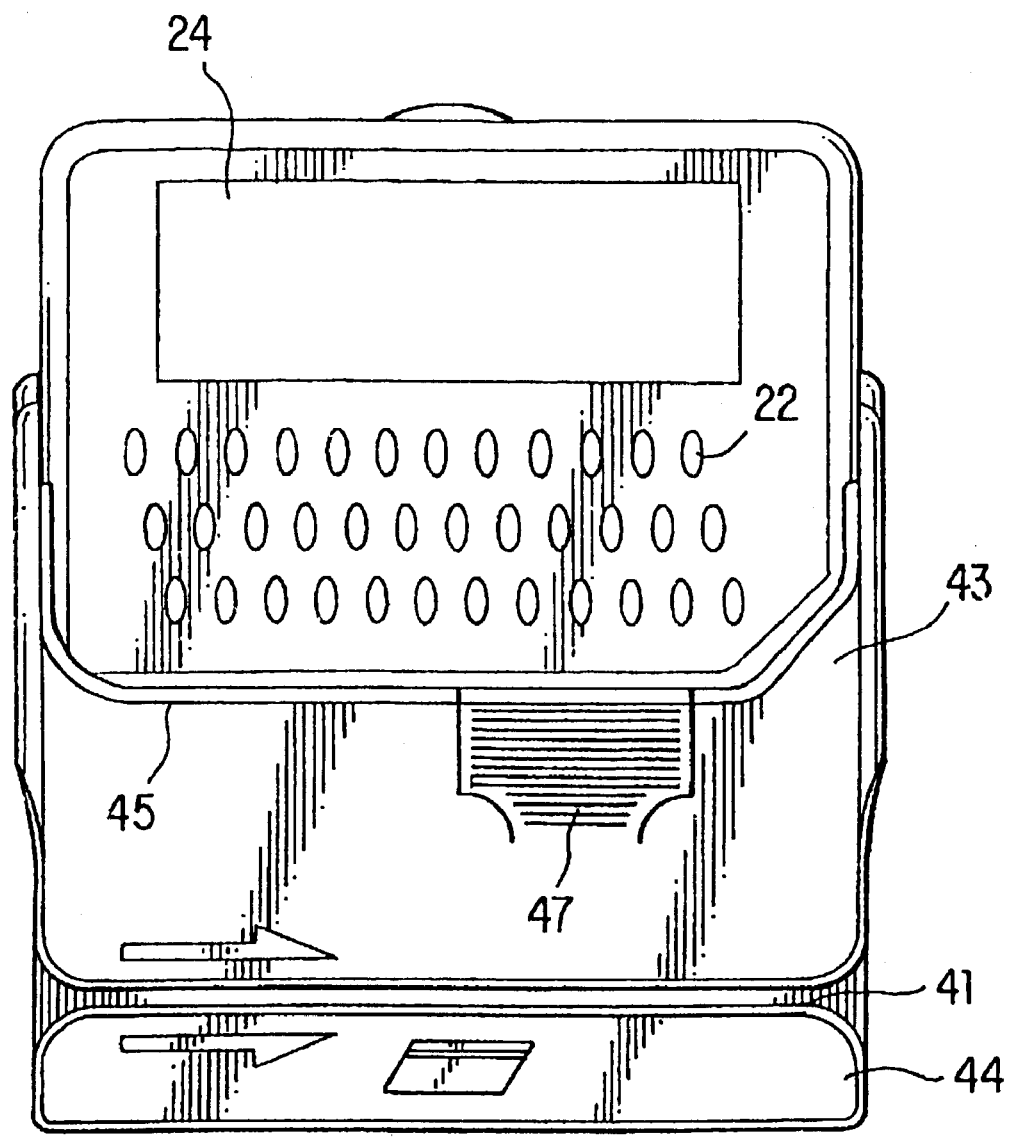
FIG. 3 is a front view of the combined pager and magnetic card reader.

Turning now to FIG. 3, the front view of the device is seen. As is shown in the figure, the pager has a screen 24 for receiving and displaying messages and a keypad 22 for the user to input commands and text. The front of the magnetic card reader 40 has an upper portion 43 and a lower portion 44. Between the two portions is the magnetic card slot 41. A card having a magnetic strip is passed through the slot 41 in order to be read. The front has a top edge 45 forming a cut-out portion for allowing continued access to the keyboard 22 when the pager is connected to the magnetic card reader. A finger grip portion 47 is formed in the front face for facilitating the insertion and removal of the pager 20.

Figure 4:
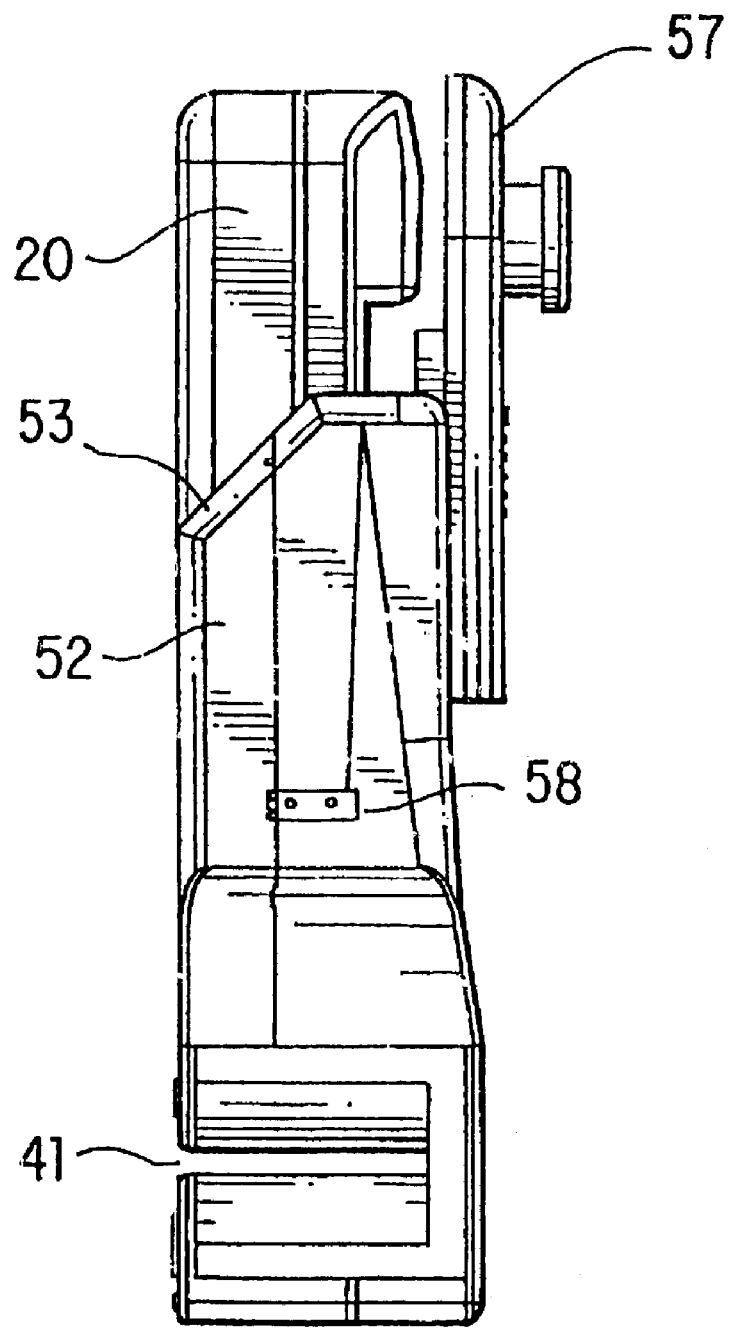
FIG. 4 is a side view of the combined pager and magnetic card reader.

FIG. 4 is the side view of the combined pager and magnetic card reader. The side wall 52 with the downwardly angled top edge 53 is clearly seen, as is its position relative to the pager 20. If desired, a serial port 58 is provided for attaching printers, other computer hard drives, and the like.

Figure 5:
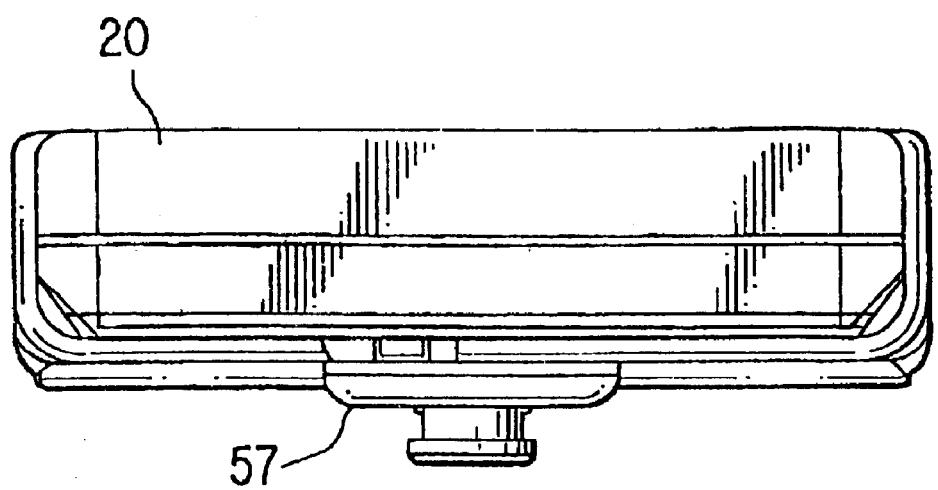
FIG. 5 is a top view of the combined pager and magnetic card reader.

FIG. 5 shows the top view of the device. As can be seen, when the two units of the pager 20 and magnetic card reader 40 are connected, they appear to be as one piece.

Figure 6:
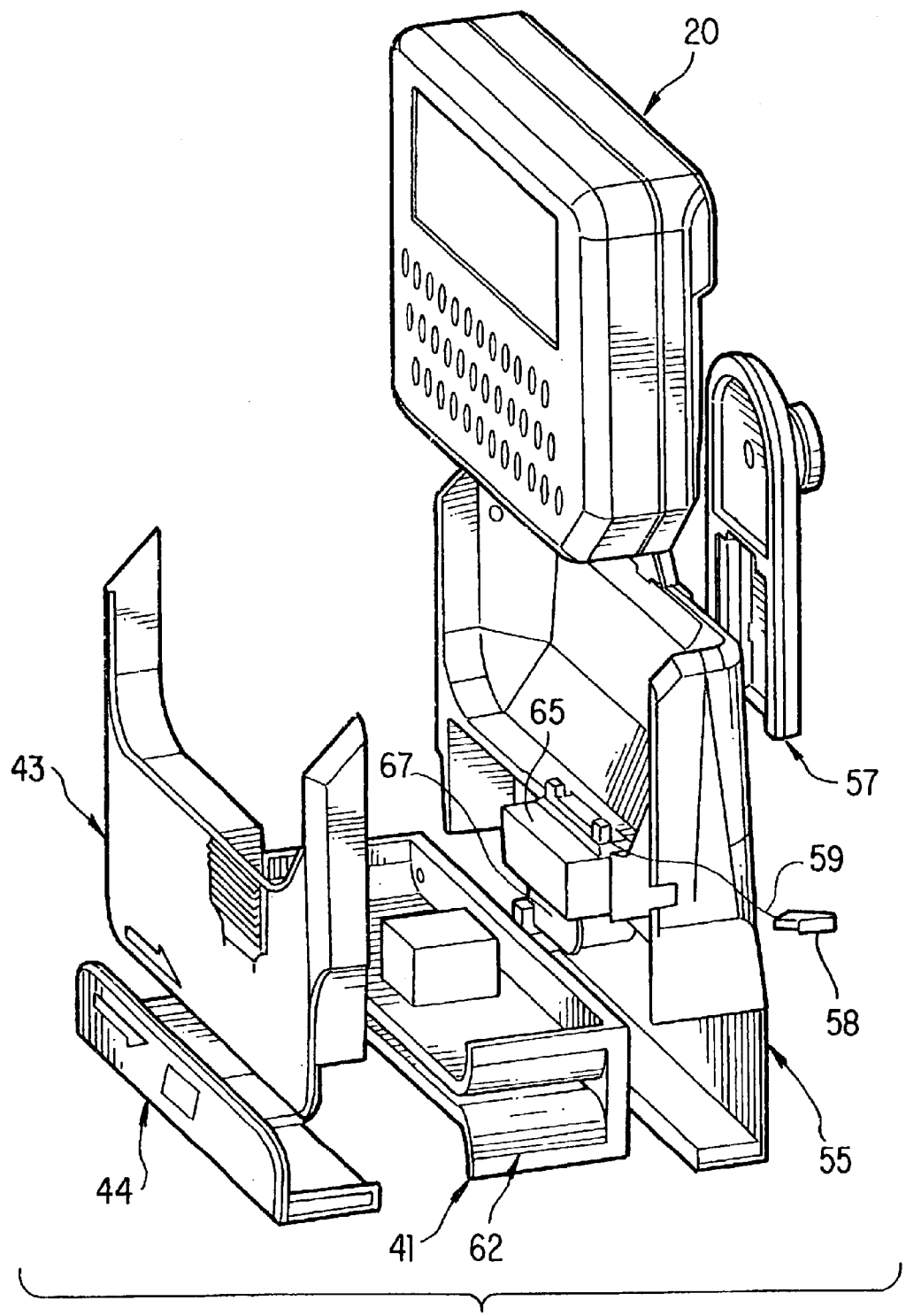
FIG. 6 is an exploded view of the combined pager and magnetic card reader.

An exploded view of the device is shown in FIG. 6. Pager 20 is removably received within the card reading module 40. The card reading slot 41 houses the magnetic strip reader 62. The bottom front panel 44 extends below the card reading slot 41 and the upper front panel 43 extends above the card reading slot 41. The front panel 43 is formed as one piece with the side panels 52. Rear panel 55 also has side panels formed as one piece. When the front panel 43 and rear panel 55 are connected to one another, the side panels complete channels for receiving and retaining the pager 20.

The pager 20 has a serial bus port in its bottom surface. The serial bus port engages a connector 65 so that the magnetic strip reader 62 receives power from the battery of the pager 20. The first connector 65 also provides data transfer between the pager 20 and the caddy. Alternatively, the connector may provide only data transfer and the magnetic strip reader provided with its own power source. A second power source prolongs the battery life of the pager. The caddy can also be supplied with power from an external source, such as a household outlet or car battery, through an adapter. A second connector 67 communicates between the magnetic strip reader and first connector 65 via a cable(not shown). The magnetic card reading module 40 can also have one or more serial bus port(s) 58 to connect the device to a peripheral device such as a printer, bar code reader or personal computer. The serial bus ports are connected to the first connector by a second cable 59.

There are many applications for the invention. It allows for remote credit card transactions. One specific application is the connection of the device to a taxi meter through the serial bus port 58. The amount of the fare and transaction approval can be communicated between the pager and applicable financial institution.

Figure 7:
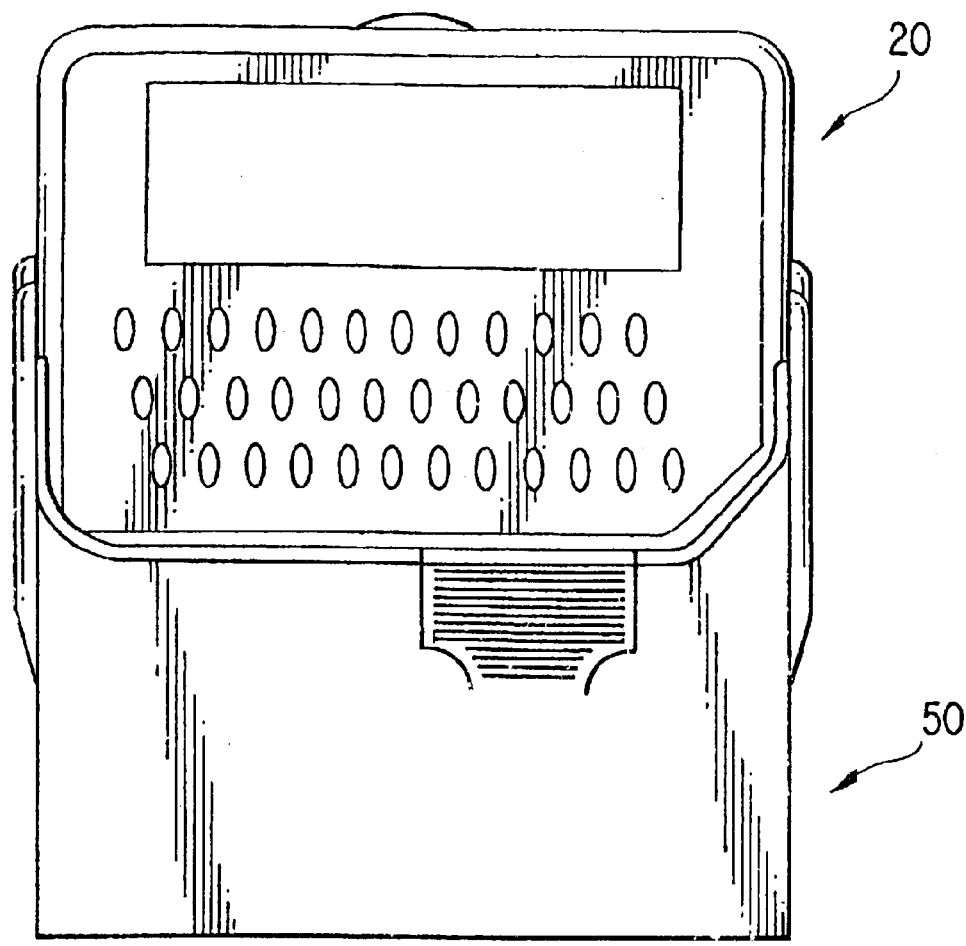
FIG. 7 is a front view of the pager combined with an optical code reader.
Figure 8:
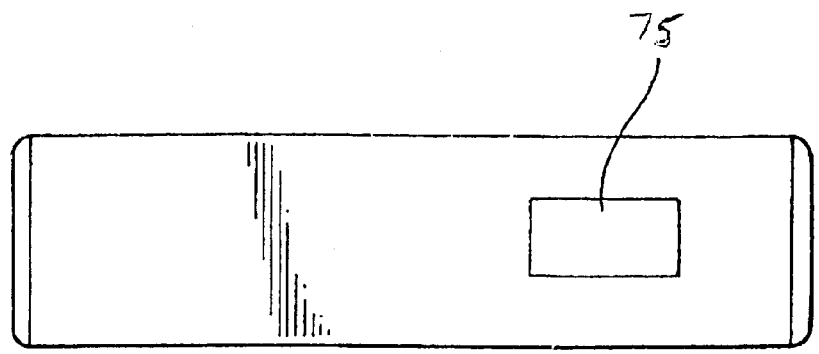
FIG. 8 is a bottom view of the caddy for the pager having an optical code reader.

FIG. 7 shows a similar device to that shown in FIGS. 1–6 but having a caddy combinable to a pager having an optical character reader (OCR) 75, commonly known as a bar code reader, in the bottom of the caddy. The bar code reader 75 can scan any bar code placed under the pager caddy when the bar code reader is activated. The bar code reader would be connected to the first connector 65 by a cable. FIG. 8 shows the bottom of the device with the bar code reader 75 clearly seen. With the OCR, it is preferred that a second power source be utilized for the OCR.

Figure 9:
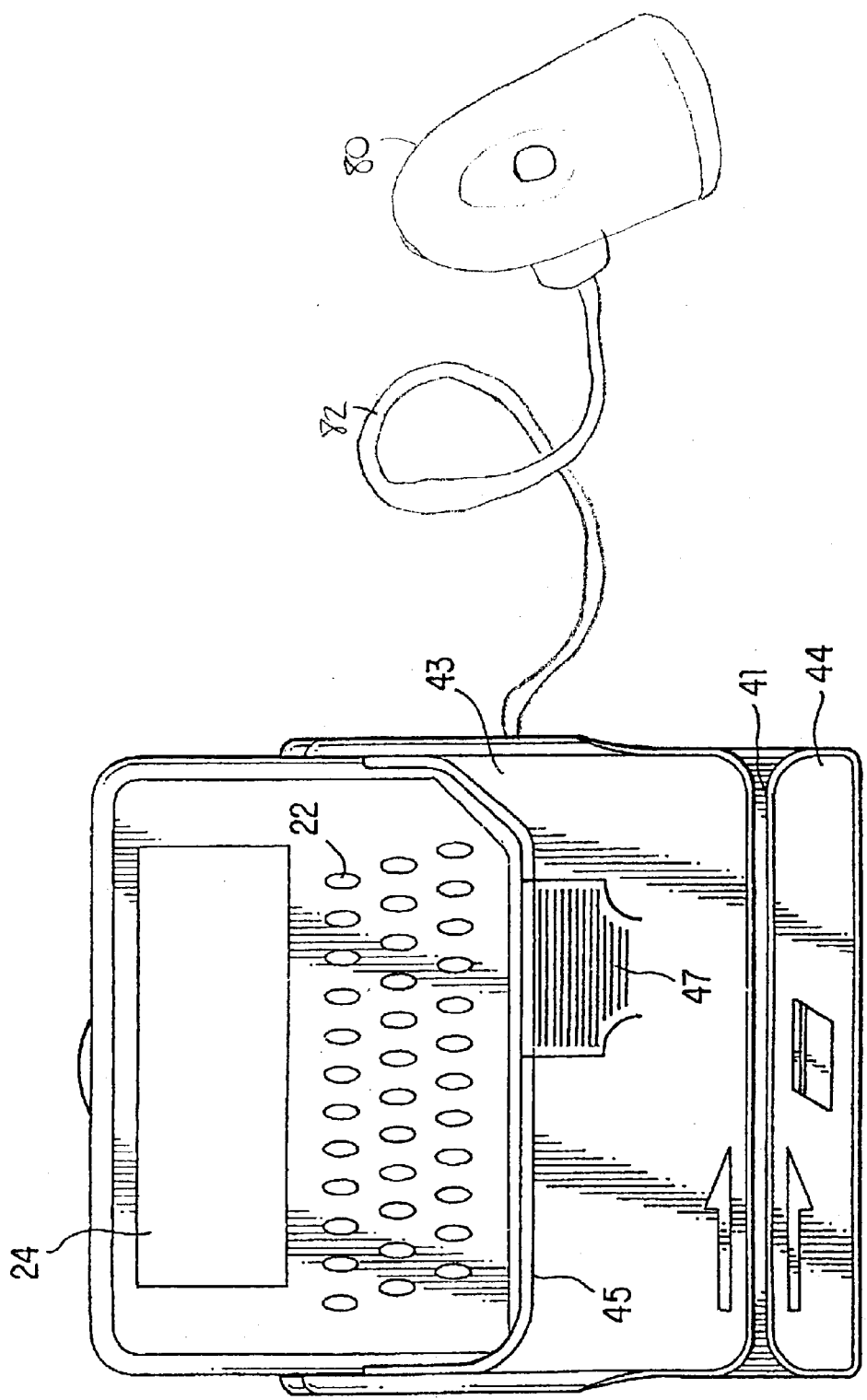
FIG. 9 is a front view of the combined pager and caddy having a magnetic strip reader with an optical code reader attached via a cable.

FIG. 9 shows the embodiment of the device having a magnetic strip reader. An optical code reader 80 is attached by a cable to the serial bus port 58 by cable 82. This allows the user to conduct transactions with both the magnetic strip reader and the optical code reader with one device. If desired, the user could attach a second magnetic strip reader to the serial bus port.

Figure 10:
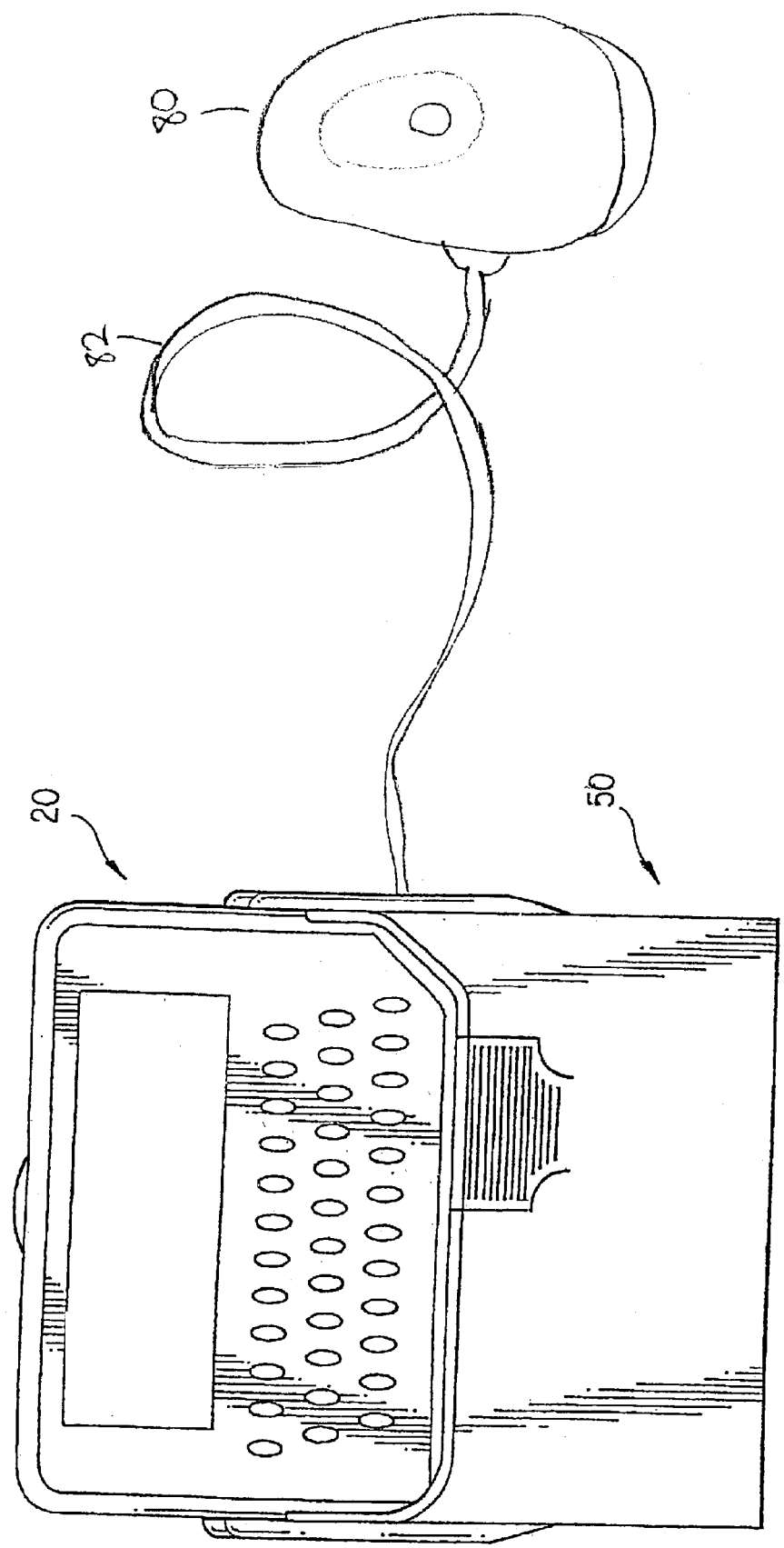
FIG. 10 is a front view of the combined pager and caddy with an optical code reader attached via a cable.

FIG. 10 depicts a caddy for a pager wherein no data reader is provided in the housing. The housing has a serial bus port similar to the other embodiments. Any type of date reader, such as a magnetic strip reader or an optical code reader 80 can be connected through the serial bus port to provide data transfer to the pager. The advantage of such a caddy is the ability to use any type of data reader that the user requires at the moment. The omission of a data reader built into the housing is a lower cost. Also, with a peripheral data reader, the data reader can be easily replaced when it malfunctions.

While the invention has been described with reference to preferred embodiments, variations and modifications would be apparent to one of ordinary skill in the art without departing from the scope of the invention. Consequently, the appended claims should not be limited to their literal terms, but should be broadly construed in accordance with the scope of the invention, as described above.

What is claimed:

1. A pager caddy, comprising:
    a housing, said housing having a cradle to receivably retain a pager,
    data reader, located in the housing, and
    a connector for engaging a pager to provide data transfer between the pager and said data reader.

2. The pager caddy of claim 1, further comprising serial bus ports for connecting said caddy to peripheral devices.

3. The pager caddy of claim 2, further comprising a second data reader attached to one of said serial bus port by a cable.

4. The pager caddy of claim 3, wherein said second data reader is a optical code reader.

5. The pager caddy of claim 1, wherein said data reader is a magnetic strip reader.

6. The pager caddy of claim 1, wherein said data reader is an optical code reader.

7. The pager caddy of claim 1, further comprising a power source for said data reader.

8. The pager caddy of claim 7, wherein said data reader is a magnetic strip reader.

9. The pager caddy of claim 7, wrein said data reader is an optical code reader.

10. The pager caddy of claim 1, further comprising a power source in said housing for said data reader.

11. A pager caddy and pager, comprising:
    a housing receivably retaining said pager,
    a data reader, located in the housing,
    a first connector for providing data transfer between said pager caddy and pager, and
    a second connector for connecting the magnetic strip reader to the pager, the second connector attached to the first connector by a first cable.

12. The pager of claim 11, further comprising a serial bus port in said housing, said serial bus port connected to the first connector by a second cable.

13. A pager caddy, comprising:
    a housing, said housing having a cradle to receivably retain a pager,
    a serial bus port for connecting said caddy to a peripheral device,
    a connector for engaging a pager to provide data transfer between the pager and said serial bus port, and
    a data reader attached to said serial bus port.

14. The pager caddy of claim 13, wherein said data reader is an optical code reader.

15. The pager caddy of claim 13, wherein said data reader is a magnetic strip reader.

* * * * *